United States Patent
Sunwoo et al.

(10) Patent No.: US 11,320,866 B2
(45) Date of Patent: May 3, 2022

(54) FLEXIBLE COVER WINDOW

(71) Applicant: UTI INC., Chungcheongnam-do (KR)

(72) Inventors: Kukhyun Sunwoo, Gyeonggi-do (KR); Hak Chui Kim, Chungcheongnam-do (KR); Tea Joo Ha, Chungcheongnam-do (KR)

(73) Assignee: UTI INC.

( * ) Notice: Subject to any disclaimer, the term of this patent is extended or adjusted under 35 U.S.C. 154(b) by 0 days.

(21) Appl. No.: 17/116,735

(22) Filed: Dec. 9, 2020

(65) Prior Publication Data

US 2021/0191467 A1 Jun. 24, 2021

(30) Foreign Application Priority Data

Dec. 23, 2019 (KR) .................. 10-2019-0172700

(51) Int. Cl.
*G06F 3/041* (2006.01)
*G06F 1/16* (2006.01)

(52) U.S. Cl.
CPC .......... *G06F 1/1652* (2013.01); *G06F 1/1641* (2013.01); *G06F 2203/04102* (2013.01); *G06F 2203/04103* (2013.01)

(58) Field of Classification Search
CPC ...... G06F 1/1641; G06F 1/1652; G06F 3/041; G09F 9/30; G09F 9/301; G09G 3/3266; G09G 3/3275; H01L 27/124; H01L 27/3276; H05K 2201/10128; C03C 15/00; C03C 17/32; B24C 1/10; B32B 17/10027
See application file for complete search history.

(56) References Cited

U.S. PATENT DOCUMENTS

| | | | | |
|---|---|---|---|---|
| 2005/0195468 A1* | 9/2005 | Sampsell | ............. | G02B 6/0055 359/292 |
| 2008/0121415 A1* | 5/2008 | Oh | ...................... | H01L 27/1214 174/254 |
| 2017/0297952 A1* | 10/2017 | Park | ........................ | C03C 15/00 |
| 2018/0081088 A1* | 3/2018 | Hwang | ................. | C03C 17/007 |
| 2018/0108717 A1* | 4/2018 | Seol | ..................... | H01L 27/3244 |
| 2018/0150105 A1* | 5/2018 | Hwang | ....................... | C09J 7/29 |
| 2019/0179066 A1* | 6/2019 | Park | ........................ | C03C 17/32 |
| 2020/0133342 A1* | 4/2020 | Choi | ................... | H01L 51/0097 |
| 2020/0159285 A1* | 5/2020 | Kim | ..................... | G06F 1/1609 |
| 2020/0194516 A1* | 6/2020 | Kim | .................... | H01L 51/5237 |
| 2020/0292731 A1* | 9/2020 | Park | ........................ | G02B 1/14 |

(Continued)

FOREIGN PATENT DOCUMENTS

| | | |
|---|---|---|
| KR | 10-2014-0015881 A | 2/2014 |
| KR | 10-2018-0093649 A | 8/2018 |
| KR | 10-2019-0084185 A | 7/2019 |

*Primary Examiner* — Joe H Cheng
(74) *Attorney, Agent, or Firm* — Mendelsohn Dunleavy, P.C.

(57) ABSTRACT

The present disclosure provides a flexible cover window comprising at least one flat portion corresponding to flat areas of a flexible display and a folding portion corresponding to a folding area of the flexible display and formed to be connected to the at least one flat portion, wherein the flexible cover window is made from a glass substrate having a pattern layer for impact dispersion thereon, wherein the pattern layer for impact dispersion is formed on the flat portion and the folding portion, and the height of the pattern layer is less than half of the thickness of the glass substrate.

20 Claims, 11 Drawing Sheets

(56) References Cited

U.S. PATENT DOCUMENTS

| | | | |
|---|---|---|---|
| 2020/0324521 A1* | 10/2020 | Park | B32B 17/10146 |
| 2020/0329575 A1* | 10/2020 | Park | G06F 1/1652 |
| 2020/0341513 A1* | 10/2020 | Kim | G02B 1/18 |
| 2020/0342789 A1* | 10/2020 | Park | G09F 9/301 |
| 2020/0361175 A1* | 11/2020 | Gan | B32B 3/085 |
| 2020/0383217 A1* | 12/2020 | Kim | E05D 3/18 |
| 2020/0392038 A1* | 12/2020 | Park | C03C 21/002 |
| 2021/0002947 A1* | 1/2021 | Park | E06B 3/28 |
| 2021/0034121 A1* | 2/2021 | Lee | G06F 1/203 |
| 2021/0107826 A1* | 4/2021 | Hwang | C03C 15/00 |
| 2021/0111230 A1* | 4/2021 | Shin | H01L 51/5281 |

\* cited by examiner

FIG. 10A (0.5mm(6.2g) Pen)

| Sample No. | Damaging Height | Sample No. | Damaging Height |
|---|---|---|---|
| 1 | 11cm | 6 | 12cm |
| 2 | 12cm | 7 | 11cm |
| 3 | 12cm | 8 | 11cm |
| 4 | 11cm | 9 | 12cm |
| 5 | 11cm | 10 | 11cm |

Patterned Flexible Cover Window Pen Drop Data

FIG. 10B (0.5mm(6.2g) Pen)

| Sample No. | Damaging Height | Sample No. | Damaging Height |
|---|---|---|---|
| 1 | 5cm | 6 | 6cm |
| 2 | 6cm | 7 | 6cm |
| 3 | 6cm | 8 | 6cm |
| 4 | 6cm | 9 | 5cm |
| 5 | 5cm | 10 | 5cm |

0.07T Flexible Cover Window Pen Drop Data

FLEXIBLE COVER WINDOW

This application claims priority to Korean Patent Application No. 10-2019-0172700, filed on Dec. 23, 2019, and all the benefits accruing therefrom under 35 U.S.C. § 119, the disclosure of which is incorporated herein in its entirety by reference.

TECHNICAL FIELD

The present disclosure relates to a flexible cover window, and more specifically to a flexible cover window which improves impact resistance by dispersing impacts with a pattern layer for impact dispersion formed on a glass substrate, thereby both the strength property and the folding property are retained.

BACKGROUND

Recently, electric and electronic technologies are developing rapidly, various types of display products are emerging to meet the needs of a new era and various consumers, and, especially, researches on a flexible display that can be folded and unfolded are actively conducted.

Started from folding a flexible display, researches are now conducted to bend, roll, and stretch the display panel, and not only the display panel itself, but a cover window protecting the display panel should be made flexible.

Such a flexible cover window is basically required to have excellent flexibility, to have no mark on the folding part even with the repeated folding and unfolding, and to have no distortion of image quality accordingly.

Conventional cover windows for the flexible displays have used polymer films such as PI or PET film on the surface of the display panels.

However, since mechanical strength of the polymer film is weak, it serves to prevent scratches on the display panel only, is vulnerable to impacts on the same, has a low transmittance, and is known to be relatively expensive.

Moreover, as the number of times of folding the display panel increases, marks remain on the folding portion of the polymer film, resulting in damage to the folded portion. For example, the polymer films are pressed or torn during folding limit evaluation (usually 200,000 times).

Recently, various research on the glass-based cover windows has been conducted to overcome the limitations of the polymer film-based cover windows.

For the glass-based cover window, there is a demand for satisfying the folding property as well as the basic physical properties for not having distortion of the image quality, and having a sufficient strength to withstand repeated contacts with a touch pen and a certain level of pressure.

In order to satisfy the strength property of the cover window, the glass should have at least a certain thickness, whereas in order to satisfy the folding property, the glass, in turn, should have a certain thickness or less, thus researches on the thickness and structure for an optimum cover window are needed, which satisfies the folding properties while satisfying the strength property and has no distortion of image quality.

Also, when a glass is thinner than a certain thickness, the inherent texture of the tempered glass is degraded, so this point should be also taken into consideration.

Accordingly, there has been a need for a technology for providing a cover window that satisfies the folding property while maintaining a proper thickness for securing strength and the unique texture of the tempered glass.

Therefore, a technology is needed which can provide a flexible cover window maintaining the unique texture of the tempered glass and a proper thickness to secure the strength and satisfying the folding property too.

SUMMARY

The object of this disclosure is to provide a flexible cover window which improves impact resistance by dispersing an impact with a pattern layer formed on a glass substrate for impact dispersion, which is formed on a glass substrate, thereby strength property and folding property are retained.

In order to achieve the above object, the present disclosure provides a flexible cover window comprising at least one flat portion corresponding to flat areas of a flexible display, and a folding portion corresponding to a folding area of the flexible display and formed to be connected to the at least one flat portion, wherein the flexible cover window is made from a glass substrate having a pattern layer for impact dispersion thereon, wherein the pattern layer for impact dispersion is formed on the flat portion and the folding portion, and the height of the pattern layer is less than half of the thickness of the glass substrate.

Preferably, the pattern layer for impact dispersion is formed on one or both surfaces of the glass substrate.

In addition, the pattern density on the folding portion and the pattern density on the flat portion are the same, or the pattern density on the folding portion can be relatively higher than the pattern density on the flat portion.

In addition, the heights of the patterns in the pattern layer for impact dispersion formed on the folding portion and on the flat portion are the same, or the height of the patterns in the pattern layer for impact dispersion formed on the folding portion can be lower than that of the patterns in the pattern layer for impact dispersion formed on the flat portion.

Preferably, the shape of the patterns for impact dispersion is at least one selected from the group consisting of semi-spheres, pyramids, cones, prisms, and cylinders, which are regularly or irregularly formed in the same sizes or different sizes.

Preferably, the pattern layer for impact dispersion is formed such that inner horizontal cross-sectional area of the glass substrate is wider than that outer horizontal cross-sectional area.

Preferably, the pattern layer for impact dispersion may have a stripe pattern, or a stripe and space pattern repeatedly formed.

Preferably, in the pattern layer for impact dispersion, the distance between the patterns formed on the flat portion are the same with the patterns formed on the folding portion, or the distance between the patterns formed on the folding portion is narrower than the patterns formed on the flat portion, and the direction of the stripe may be formed along a folding line.

Preferably, the pattern layer for impact dispersion may be formed by any one of wet etching, laser patterning, blasting, and roller stamping, or any one of wet etching process after laser patterning, a wet etching process after blasting, and wet etching processes after roller stamping.

In addition, the flexible cover window further comprises a buffer resin layer formed on the front surface of the glass substrate on which the pattern layer for impact dispersion is formed, and a cover glass substrate may be formed on the buffer resin layer.

Furthermore, according to the present disclosure, concave spaces of the pattern layer for impact dispersion are filled with a transparent resin material.

Preferably, a transparent resin layer is formed over the transparent resin material on the pattern layer for impact dispersion, the transparent resin material is filled first and the transparent resin layer is formed using the same material and the same process, or the transparent resin material is filled first and the transparent resin layer is formed later using different material.

In addition, the transparent resin layer may be formed on the front surface and a rear surface of the glass substrate, or on the entire surfaces of the front surface, the rear surface and side surfaces.

In addition, the transparent resin layer formed on the rear surface of the glass substrate and the transparent resin layer formed on the front surface of the glass substrate are formed with the same material, or the transparent resin layer formed on the rear surface of the glass substrate is formed with a relatively softer material than that of the transparent resin layer formed on the front surface.

According to the present disclosure, the transparent resin material and the transparent resin layer are preferably formed of Optically Clear Resin (OCR).

Preferably, the flexible cover window further comprises a functional coating layer, and the functional coating layer is formed of a single layer or multiple layers.

In addition, when the functional coating layer formed on the front surface of the cover window is formed in multiple layers, it is preferable that the higher a layer is, the harder a material of the layer is, and an AF (Anti-Finger) or AR (Anti-Reflective) function is applied to the functional coating layer formed on the top.

In addition, it is preferable that the functional coating layer formed on the front surface of the cover window is implemented as a strength reinforcing layer, and the functional coating layer formed on the rear surface of the cover window is implemented as an elasticity reinforcing layer.

The present disclosure relates to a flexible cover window which improves impact resistance by dispersing impacts with a pattern layer for impact dispersion formed on a glass substrate, thereby the strength property and the folding property are retained.

In other words, by implementing a pattern layer for impact dispersion on the entire surfaces of the glass substrate, the effective thickness is reduced, and, when a pen-drop impact is applied, the impact is dispersed between the patterns, thereby increasing the stiffness against the pen drop impact, thus the strength property and the folding property are simultaneously satisfied.

The present disclosure provides a flexible cover window made from a composite material of a glass and a resin, which maintains the texture of the glass as much as possible and reinforces the flexibility, resilience, elasticity and strength properties of the resin, especially, the resin absorbs the impact like pen-drop and further improves impact resistance while the pattern layer for impact dispersion is not seen externally.

In addition, by forming a buffer resin layer on the entire surfaces of the glass substrate, the impact such as pen-drop can be absorbed or effectively transmitted to the outside, thereby further improving pen-drop strength property.

In addition, the present disclosure provides a flexible cover window of which folding property is improved by performing a patterning process on the entire area of the glass substrate instead of making the folding part thin as in conventional flexible cover windows, and of which productivity is excellent because a time consuming process, such as an alignment process, is not needed.

In addition, it is possible to eliminate the generation of a stress due to the difference in thickness of the glass in the flat portion and the folding portion which occurs in the conventional cover window where the folding area is made thin, thereby improving impact resistance and minimizing screen distortion or resolution reduction, and providing a high-quality flexible display.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The present disclosure relates to a flexible cover window which improves impact resistance by dispersing impacts with a pattern layer for impact dispersion formed on a glass substrate, thereby the strength property and the folding property are retained.

In other words, by implementing a pattern layer for impact dispersion on the entire surfaces of the glass substrate, the effective thickness is reduced, and, when a pen-drop impact is applied, the impact is dispersed between the patterns, thereby increasing the stiffness against the pen drop impact, thus the strength property and the folding property are simultaneously satisfied.

Figure 1A:
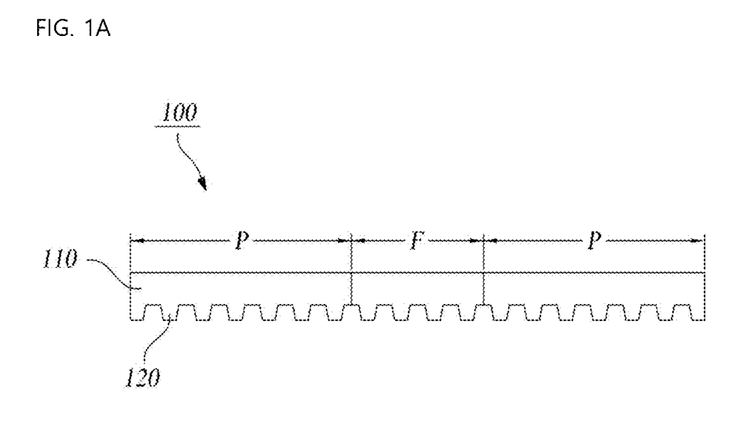
FIG. 1A is s schematic cross-sectional view of a flexible cover window according to an embodiment of the present disclosure.
Figure 1B:
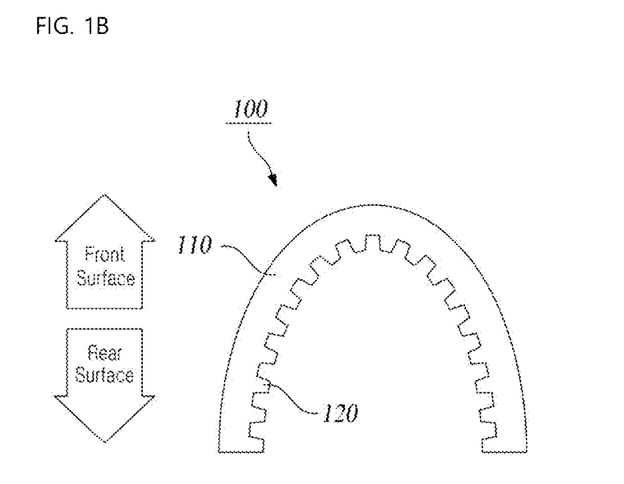
FIG. 1B is a schematic cross-sectional view of the flexible cover window in folded state according to an embodiment of the present disclosure.
Figure 2A:
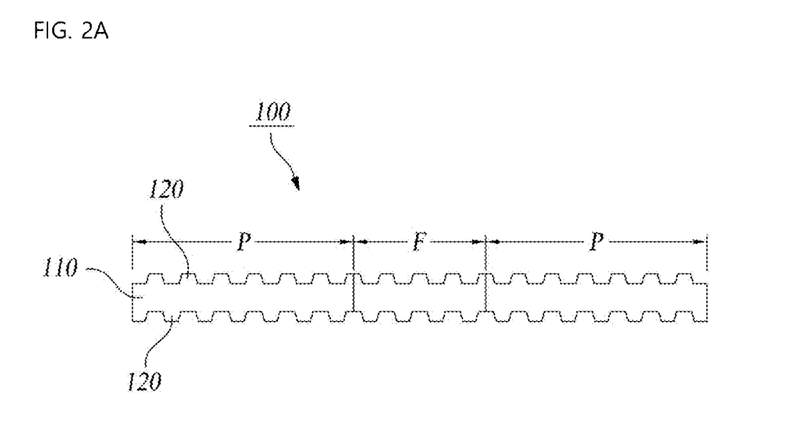
FIG. 2A is a schematic cross-sectional view of a flexible cover window according to another embodiment of the present disclosure.
Figure 2B:
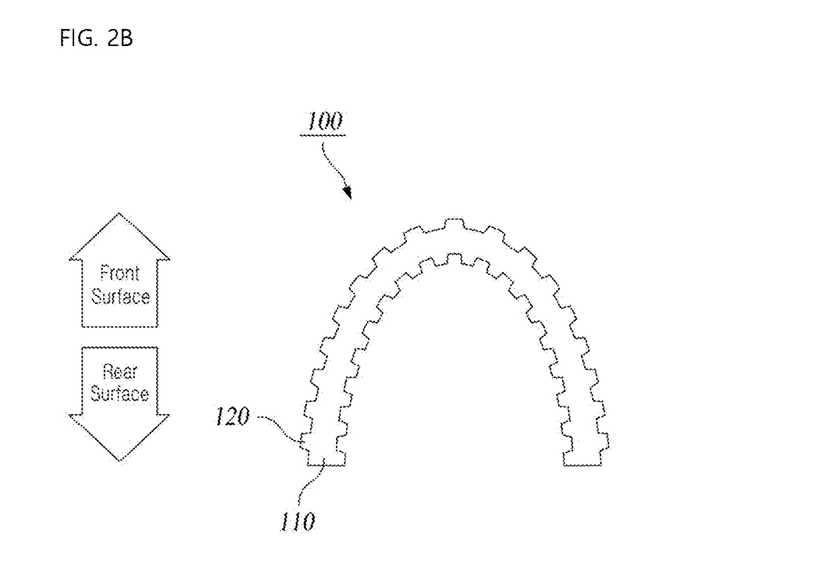
FIG. 2B is a schematic cross-sectional view of the flexible cover window according to another embodiment of the present disclosure.
Figure 3:
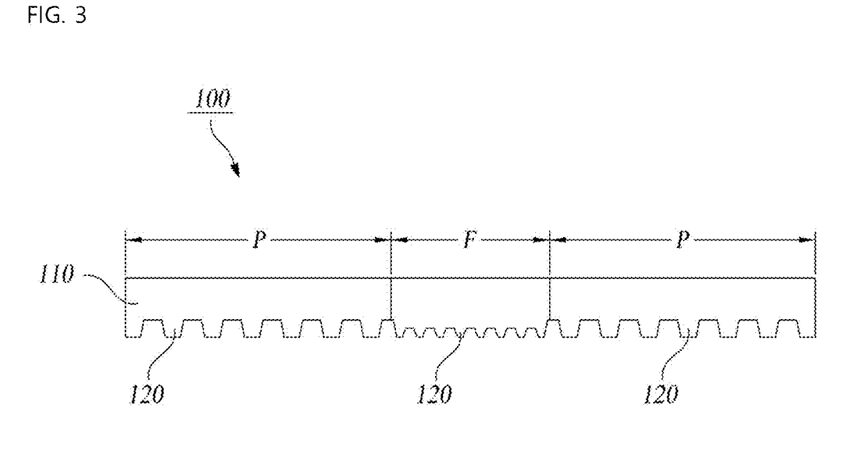
FIG. 3 is a schematic cross-sectional view of a flexible cover window according to another embodiment of the present disclosure.
Figure 4A:
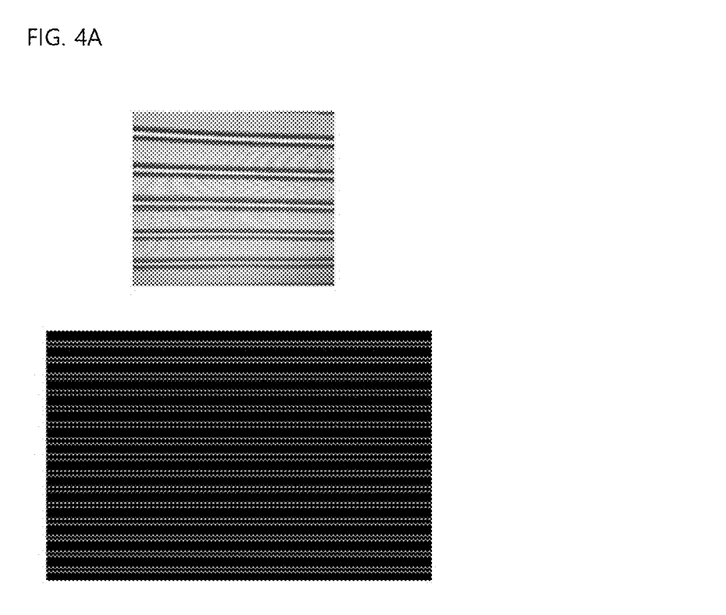
FIGS. 4A, 4B and 4C show various embodiments of masks for forming a pattern layer for impact dispersion according to the present disclosure.
Figure 4B:
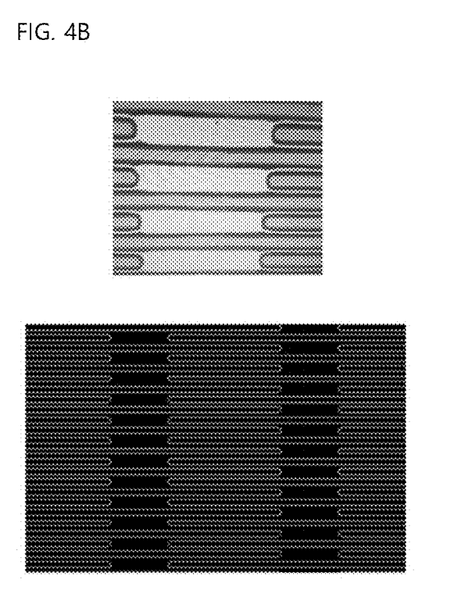
Figure 4C:
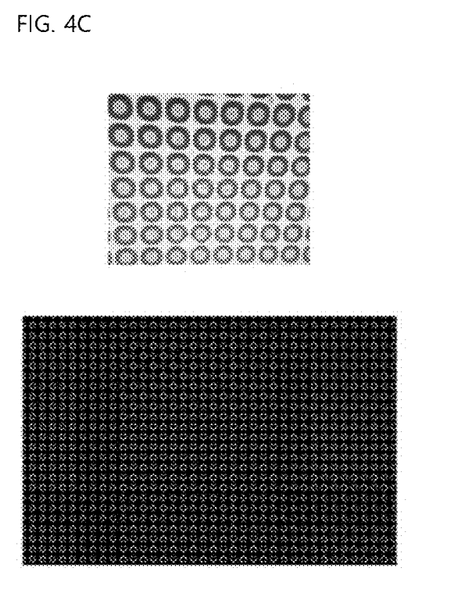
Figure 5A:
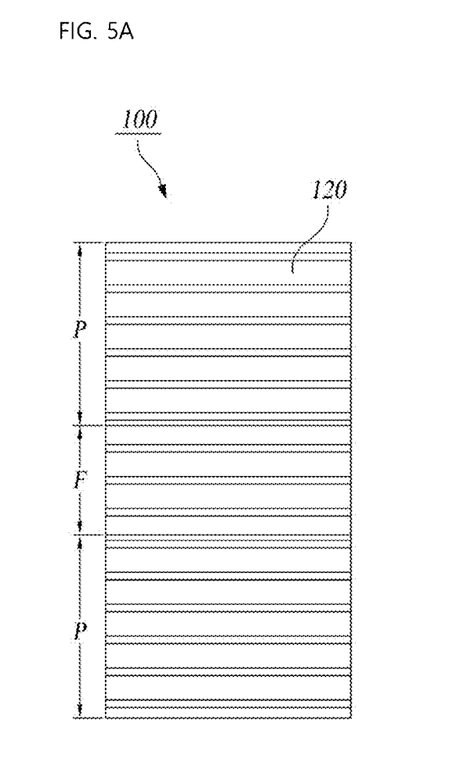
FIGS. 5A, 5B and 5C show pattern layers for impact dispersion which are formed on a glass substrate using various masks in FIGS. 4A, 4B and 4C.
Figure 5B:
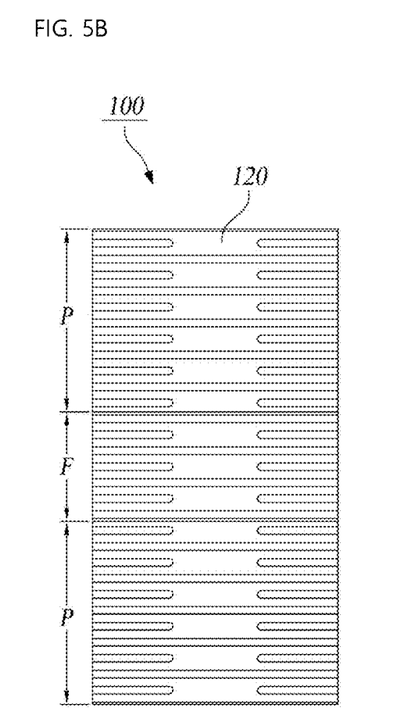
Figure 5C:
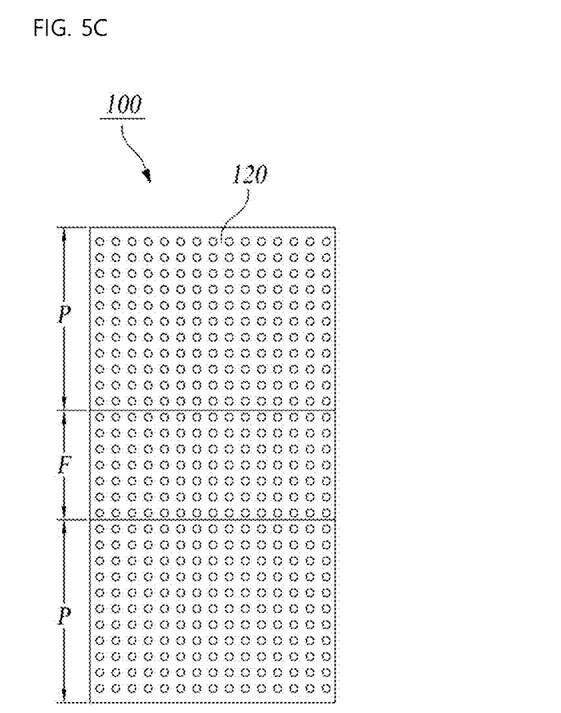

Hereinafter, the present disclosure will be described in detail with reference to the accompanying drawings. FIG. 1A is s schematic cross-sectional view of a flexible cover window according to an embodiment of the present disclosure, FIG. 1B is a schematic cross-sectional view of the flexible cover window in folded state according to an embodiment of the present disclosure, FIG. 2A is a schematic cross-sectional view of a flexible cover window according to another embodiment of the present disclosure, FIG. 2B is a schematic cross-sectional view of the flexible cover window according to another embodiment of the present disclosure, FIG. 3 is a schematic cross-sectional view of a flexible cover window according to another embodiment of the present disclosure, FIGS. 4A to 4C show various embodiments of masks for forming a pattern layer for impact dispersion according to the present disclosure, FIGS. 5A to 5C show pattern layers for impact dispersion which are formed on a glass substrate using various masks in FIGS. 4A to 4C, FIGS. 6A, 6B, 7, 8A, 8B, 9A to 9B are schematic cross-sectional views of a flexible cover window according to various embodiments of the present disclosure, FIG. 10A shows data for pen-drop property of a flexible cover window according to an embodiment of the present disclosure, and FIG. 10B shows data for pen-drop property of a conventional flexible cover window.

As shown in the drawings, the flexible cover window 100 according to the present disclosure has a flat portion P corresponding to the flat area of a flexible display, and folding portion F which is formed to be connected to the flat portion P, and corresponds to the folding area of the flexible display. The flexible cover window 100 includes a glass substrate 110, and an pattern layer for impact dispersion 120 formed on the glass substrate 110. The pattern layer for impact dispersion 120 is formed on entire area of the flat portion P and the folding portion F, and its height is less than half the thickness of the glass substrate 110.

The present disclosure provides a cover window 100 that is formed on the front surface of the display panel to protect the display panel and to maintains the folding property and strength property. The cover window 100 according to the present disclosure can be disposed on a CPI (Clear Polyimide) cover to be used for protecting the CPI cover.

Here, the folding area of the display refers to an area where the display is folded in half or bent, and the portion in which the cover window 100 is folded corresponding to the folding area is referred to as the folding part F of the cover window 100 in the present disclosure. And, the portion excluding the folding portion F, that is, corresponding to the flat area of the display, is referred to as a flat portion P of the cover window 100.

The folding type of the display in the present disclosure includes both in-folding or out-folding and the cover window 100 according to the present disclosure can be applied to any flexible display that is operated as in-folding, out-folding or both in-folding and out-folding.

The cover window according to the present disclosure is based on glass material and is formed of a glass substrate 110 and a pattern layer for impact dispersion 120 formed on the glass substrate 110.

The pattern layer for impact dispersion 120 may be formed on either one or both surfaces of the glass substrate 110, and regular or irregular patterns are continuously formed by dry or wet etching of the glass substrate 110.

According to the present disclosure, the folding region is not etched to be thin as in the conventional way to enhance the folding property of the cover window 100, but a predetermined pattern layer is formed by patterning on either one or both sides of the glass substrate 110.

In general, when manufacturing a flexible cover window 100 made of a glass material, the thickness of the glass substrate 110 must be thin, and, at the same time, should have at least a certain level to secure the strength property.

For example, when the radius of curvature is at least 0.5 mm or more at the time of folding, the thickness of the cover window 100 should be at most 200μm, preferably 20-100 μm. In this case, when an impact is applied by a stuff with small cross-sectional area like a pen-drop on the upper surface (front surface) of the glass substrate 110, the entire glass substrate 110 could be deformed or damaged around the pen drop contact portion.

In the case of the conventional cover windows 100 having a folding area processed to be thin, the thickness of the portion is particularly thin. So, the pen drop property is very weak, and a stress is likely to occur because of the difference in thickness between the folding area and the flat area, along with the problem related with the waviness of the glass substrate 110, hence, the cover windows have not good impact resistance.

In order to improve impact resistance through the improvement of the pen drop property, and at the same time, to improve the folding property and strength property, the pattern layer for impact dispersion 120 according to the present disclosure is provided on either one or both sides of the glass substrate 110 for not only on the flat surface P but on the folding part F too.

Therefore, when a pen drop impact is applied on the glass substrate 110, the impact force is transmitted to inside of the glass substrate 110 and is dispersed or absorbed by the pattern layer for impact dispersion 120.

Furthermore, in the glass substrate according to the present disclosure, a pattern layer for impact dispersion 120 is formed on the entire surface of the glass substrate 110, the stress difference due to the difference in thickness can be solved, thereby improving impact resistance and minimizing screen distortion or resolution degradation, thus a high-quality flexible display can be provided.

In general, the back surface (the opposite surface to the side to which an impact is applied) of the glass substrate 110 is more vulnerable to the pen drop impact force, in one embodiment of the present disclosure, the pattern layer for impact dispersion 120 may be formed on the back surface of the glass substrate 110 as shown in FIGS. 1A and 1B.

By doing so, the impact transmitted from the front surface of the glass substrate 110 is transmitted to inside the glass substrate 110 and the impact can be dispersed or absorbed by the pattern layer for impact dispersion 120 formed discontinuously.

In addition, as shown in FIGS. 2A and 2B, the pattern layer for impact dispersion 120 may be formed on both sides of the glass substrate 110, that is, the front and the rear surfaces, and the impact can be primarily absorbed by the pattern layer for impact dispersion 120 formed on the front surface which includes the impact receiving point, and the impact force transmitted inside the glass substrate 110 can be absorbed by the pattern layer for impact dispersion 120 formed on the back surface too.

As described above, the pattern layer for impact dispersion 120 is formed on the entire areas of the folding part F and the flat part P of the glass substrate 110, therefore, it is possible to simplify the overall process since the alignment process, etc., which makes the folding part F thin to secure the existing folding property, is not required.

Preferably, the height of the pattern layer for impact dispersion 120 according to the present disclosure is less than half the thickness of the glass substrate 110, more preferably in the range of 10 to 30% of the thickness of the glass substrate 110.

If the height is lower than 10%, the effect of dispersing the impact force is insignificant, and if it is higher than 50%, the overall strength property is deteriorated due to a decrease in the effective thickness.

The pattern density of the pattern layer for impact dispersion 120 formed on the folding portion F and on the flat portion P may be the same or substantially the same. Here, the "pattern density" means the ration of the area on which the pattern layer for impact dispersion is formed to the area of the entire glass substrate 110.

However, if necessary, the pattern density of the pattern layer for impact dispersion 120 formed on the folding part F may be higher than the pattern density of the pattern layer for impact dispersion 120 formed on the flat part P.

Specifically, if the pattern density of the pattern layer for impact dispersion 120 formed on the flat part P is about 10 to 50% with respect to the entire glass substrate 110, The pattern density of the pattern layer for impact dispersion 120 on the folding part F may be formed to be the same or almost similar, or may be formed with a higher density of about 20 to 70%.

When the density of the pattern layer for impact dispersion 120 formed on the folding part F is higher than the above range, the strength may decrease. Therefore, it is preferable to form the pattern density within the above range.

This is to enhance the dispersion effect of the impact further while enhancing the folding property at the folding part F.

The height of the pattern of the pattern layer for impact dispersion 120 formed on the folding part F and the pattern of the pattern layer for impact dispersion 120 formed on the flat part P are the same or substantially the same.

If required, the height of the pattern of the pattern layer for impact dispersion 120 formed on the folding part F could be lower than the height of the pattern of the pattern layer for impact dispersion 120 formed on the flat part P.

That is, the height of the pattern is formed lower and the pattern density is formed higher in the folding part F, thereby improving the pen drop property and the strength property at the same time, while improving the folding property too.

Preferably, the shape of the patterns for impact dispersion 120 is at least one selected from the group consisting of semi-spheres, pyramids, cones, prisms, and cylinders, which are regularly or irregularly formed, and the height of the pattern can be varied to disperse the impact transmitted inside the glass substrate 110.

And, the patterns of pattern layer for impact dispersion 120 can be formed such that inner horizontal cross-sectional area of the glass substrate is wider than outer horizontal cross-sectional area, that is, the closer to the back surface of the glass substrate 110 which is attached to the display panel, the smaller the horizontal cross-sectional area is to disperse the impact transmitted inside the glass substrate 110.

FIG. 3 illustrates an embodiment according to the present disclosure in which the patterns of the pattern layer for impact dispersion 120 is formed more densely and have lower height in the folding part F compared to in the flat part P.

The pattern layer for impact dispersion 120 may be formed by any one of wet etching, laser patterning, blasting, or roller stamping, or any one of wet etching process after laser patterning, a wet etching process after blasting, and wet etching processes after roller stamping.

Here, the roller stamping process is to form a pattern layer for impact dispersion by hot pattern roller stamping during the glass molding in a glass drawing tower.

Namely, a photoresist or DFR is formed on the glass substrate 110, patterned, and then used as an etching mask to be used in any one of wet etching, laser patterning, blasting, or roller stamping, or any one of wet etching process after laser patterning, a wet etching process after blasting, and wet etching processes after roller stamping.

As described above, the pattern layer for impact dispersion 120 is formed in entire regions of the flat portion P and the folding portion F, therefore, any masking alignment process is not required, but the above etching process conditions are controlled to make the thickness of the pattern to be less than half the thickness of the glass substrate 110.

In addition, a stripe pattern or a stripe and space pattern can be formed repeatedly in the pattern layer for impact dispersion 120 according to another embodiment of the present disclosure.

Here, the distance between the patterns in the pattern layer for impact dispersion 120 formed on the flat portion P and the folding portion F can be formed the same or substantially the same each other.

If required, the distance between the patterns in the pattern layer for impact dispersion 120 on the folding part (F) is narrower that the distance between the patterns formed on the flat part (P), and the direction of the stripe is parallel to the folding line in order to supplement the pen drop property, strength property, and the folding property.

FIGS. 4A to 4C show various embodiments of masks for forming a pattern layer for impact dispersion 120 according to the present disclosure, and FIGS. 5A, 5B and 5C show pattern layers for impact dispersion which are formed on a glass substrate 110 using various masks in FIGS. 4A, 4B and 4C.

FIG. 4A shows a mask on which a stripe pattern is formed. When this mask is used in an etching process, the stripe pattern is formed on one surface of the glass substrate 110 as shown in FIG. 5A.

FIG. 4B shows a mask on which a stripe and a space pattern is formed. When this mask is used in an etching process, the stripe and a space pattern is formed on one surface of the glass substrate 110 as shown in FIG. 5B.

FIG. 4C shows a mask on which a circle pattern is formed. When this mask is used in an etching process, the circle pattern is formed on one surface of the glass substrate 110 as shown in FIG. 5C.

By forming the pattern layer for impact dispersion 120 on the glass substrate 110 as described above, impact force can be dispersed, and, even if the thickness of the glass substrate 110 as a whole is not reduced, but the effective thickness is reduced, thereby impact resistance to pen drop can be improved, and it contributes to improve the folding property and strength property on the whole.

In another embodiment according to the present disclosure, a buffer resin layer 150 is formed on the front surface of the glass substrate 110 on which the pattern layer for impact dispersion 120 is formed, and a cover glass 160 is formed on the buffer resin layer 150.

That is, the buffer resin layer 150 is formed between the glass substrates 110 and 160, and the pattern layer 120 for impact dispersion is formed on the glass substrate 110 on the rear side.

Accordingly, when an impact is applied to the front surface, the impact is primarily absorbed in the buffer resin layer 150 and secondarily absorbed by the pattern layer for impact dispersion 120.

In this case, the thicknesses of the cover glass substrate 160 and the glass substrate 110 may be formed to be thinner further, and the impact resistance to the pen drop is improved, the folding property and the overall strength are increased too.

Meanwhile, a transparent resin material 130 can be filled in the concave spaces of the pattern layer for impact dispersion according to the present disclosure, and can be bonded to the entire surface of the display panel without any empty space.

By filling transparent resin material 130 in the concave spaces of the pattern layer for impact dispersion 120, a cover window 100 having uniform thickness is provided, and the visibility and bonding properties can be improved since there is no empty space (air layer) between the cover window 100 and the display panel.

As for the transparent resin material 130, a transparent resin such as OCR (Optically Clear Resin) having almost the same refractive index 1.5 of glass, for example, acryl, epoxy, silicon, urethane, urethane composite, urethane acrylic composite, hybrid sol gel, a siloxane or the like can be used. Depending on the properties of the transparent resin material 130 used, various combinations can be mixed to reinforce the strength and the elasticity.

In addition, a transparent resin layer 140 is formed over the transparent resin material 130 formed on the pattern layer for impact dispersion 120, the transparent resin material 130 and the transparent resin layer 140 can be formed with the same material sequentially, or the transparent resin material 130 and the transparent resin layer 140 may be formed continuously with the same material or different material by a sequential process.

Namely, the transparent resin material 130 and the transparent resin layer 140 may be formed simultaneously by the same process or, if required, formed by difference processes respectively, and formed in a single layer or a multilayers with special functions.

The transparent resin layer 140 can be formed on the front surface and the rear surface of the glass substrate 110, or may be formed on entire surfaces of the front surface, the rear surface and the side surface of the glass substrate 110, the transparent resin layers 140 formed on the rear surface and the front surface of the glass substrate 110 can be formed by the same material, or the transparent resin layer 140 formed on the rear surface may be formed of a material that is relatively softer than the transparent resin layer 140 formed on the front surface of the glass substrate 110.

This allows durability to be maintained by forming the transparent resin layer 140 of a relatively hard material for the part touched by the users.

In addition, the part to be folded according to the in-folding or out-folding method is formed by a harder material, and the part to be stretched is formed by a relatively soft material to minimize cracks in the part to be stretched.

Figure 6A:
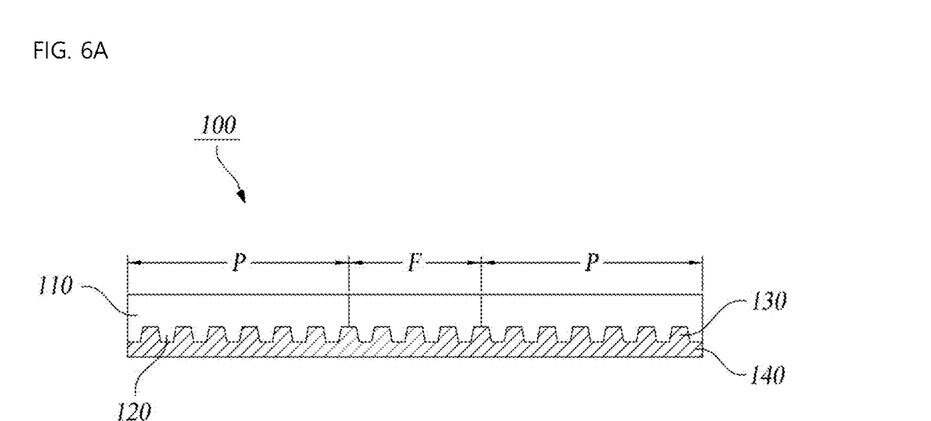
FIGS. 6A, 6B, 7, 8A, 8B, 9A to 9B are schematic cross-sectional views of a flexible cover window according to various embodiments of the present disclosure.
Figure 6B:
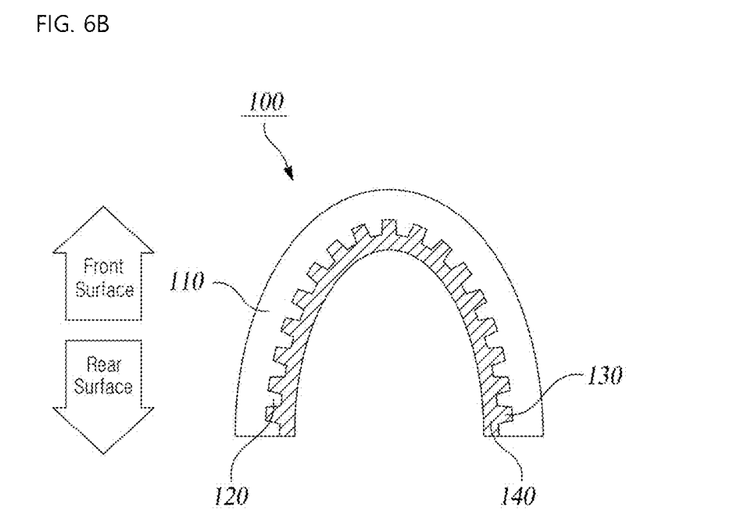
Figure 7:
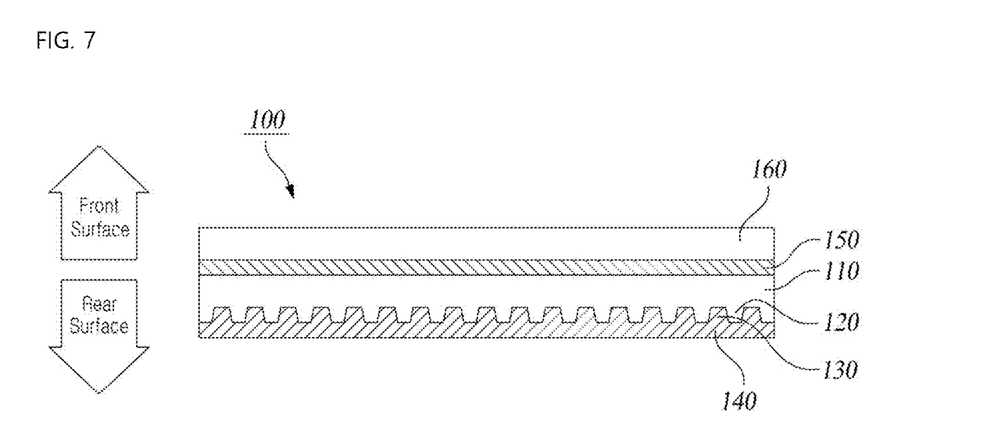

FIGS. 6A, 6B and FIG. 7 illustrate that the transparent resin material 130 is filled in the pattern layer for impact dispersion 120 according to an embodiment of the present disclosure, and the transparent resin layer 140 is formed as an upper layer thereof.

FIG. 6A illustrates that the pattern layer for impact dispersion 120 is formed on the rear surface of the glass substrate 110, and the transparent resin material 130 is filled in the pattern layer for impact dispersion 120, and the transparent resin layer 140 is formed over the transparent resin material 130 on glass substrate 110. FIG. 6B is a schematic diagram showing the out-folding of the cover window 100 of FIG. 6A.

FIG. 7A shows that a pattern layer for impact dispersion 120 is formed on the rear surface of the glass substrate 110, and after filling the transparent resin material 130 in the pattern layer for impact dispersion 120, The transparent resin layer 140 is formed over the transparent resin material on the glass substrate 110. Further, a buffer resin layer 150 is formed on the front surface of the glass substrate 110, and a cover glass substrate 160 is formed on the upper layer thereof.

Figure 8A:
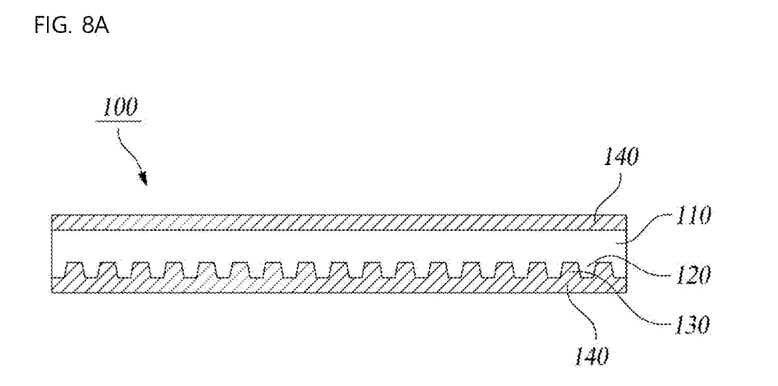
Figure 8B:
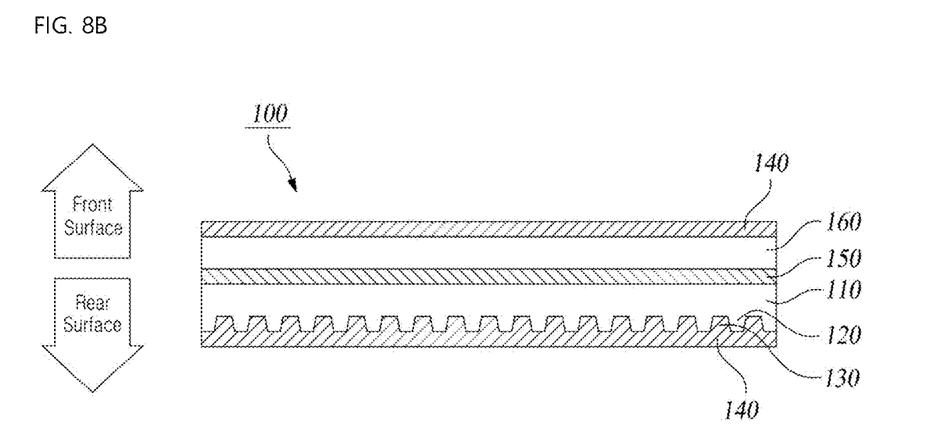

FIGS. 8A and 8B are diagrams illustrating that a transparent resin layer 140 is formed on the front surface of the glass substrate 110 or the cover glass substrate 160 in the embodiments of FIGS. 6 and 7. As described above, the transparent resin layer 140 formed on the front surface is formed of a harder material than the transparent resin layer 140 formed on the rear side.

As shown in FIGS. 6 to 8, in the present disclosure, a composite material made of glass and a resin material can maintain the texture of the glass as much as possible while reinforcing flexibility, restitution force, elasticity and strength property by the resin material.

In particular, according to the present disclosure, the impact is dispersed or absorbed further by forming the pattern layer for impact dispersion 120 on the glass substrate 110 and forming the transparent resin material 130 as well as the transparent resin layer 140, thus the impact resistance is improved.

In addition, while minimizing the occurrence of cracks in the folding part F and preventing the pattern layer for impact dispersion 120 from being visually seen from outside, the transparent resin material 130 is filled in the pattern layer for impact dispersion 120 evenly, thus the flatness of the portion in contact with the display panel can be secured.

In addition, where the surface is in contact with the display panel, the cover window 100 is reinforced with elasticity to improve impact resistance, and when the glass is broken, scattering of the glass is prevented.

Figure 9A:
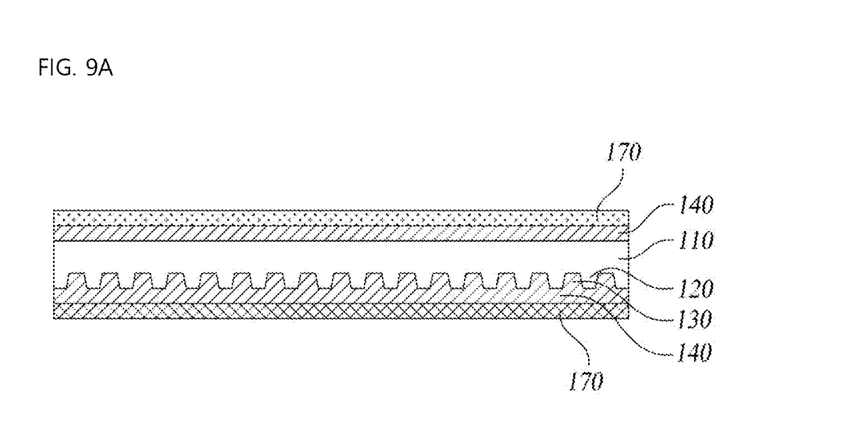
Figure 9B:
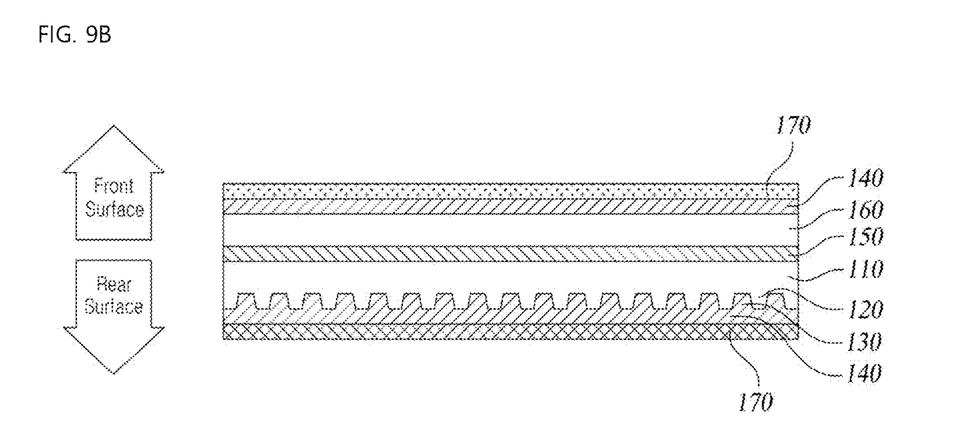
Figure 10A:
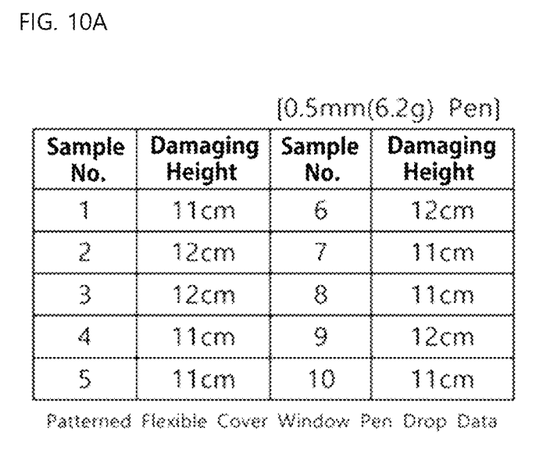
FIG. 10A shows data for pen-drop property of a flexible cover window according to an embodiment of the present disclosure.
Figure 10B:
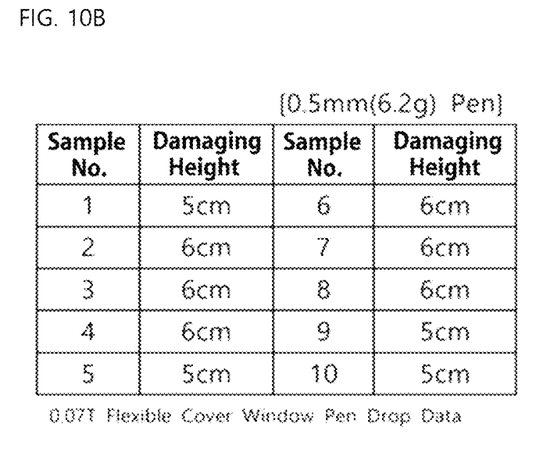
FIG. 10B shows data for pen-drop property of a conventional flexible cover window.

As shown in FIGS. 9A and 9B, a functional coating layer 170 can be formed further on one or both surfaces of the cover window 100. The functional coating layer 170 is formed of a transparent material, such as the transparent resin material 130 described above, and a resin having various properties is synthesized to provide functionality.

When the transparent resin material 130 is filled in the pattern layer for impact dispersion 120 or the transparent resin layer 140 is formed on the entire surface of the glass substrate 110, the functional coating layer 170 is formed thereon. It can be formed by a known resin coating method such as spray, dipping, and spin coating.

The functional coating layer 170 may be formed as a single layer or multiple layers, and the functional coating layer 170 formed on the front surface of the cover window 100 is used as a strength reinforcing layer, and a functional coating layer 170 formed on the rear surface of the cover window 100 is used as an elasticity reinforcing layer.

Namely, since the users touch the front surface of the cover window 100, the functional coating layer 170 reinforces strength property, and the functional coating layer 170 on reinforces elasticity for the rear surface of the cover window 100 to provide a buffer function for the display panel.

For the case of the strength reinforcing (hard coating) on the front surface of the cover window 100, a resin having a relatively high hardness when cured, such as an acrylic or epoxy resin, is used, and for case of the elasticity reinforcing (soft coating) on the back surface of the cover window 100, a resin having a relatively high elasticity when cured, such as silicone and urethane synthetic resins, is used. In addition, the strength or the elasticity can be reinforced by adjusting the content of organic or inorganic substances in the organic-inorganic hybrid sol gel.

In addition, when the functional coating layer formed on the front surface of the cover window is formed in multiple layers, it is preferable that the higher a layer is, the harder a material of the layer is.

And, an AF (Anti-Finger) or an AR (Anti-Reflective) function can be applied to the functional coating layer 170, especially to the functional coating layer 170 formed on the top, the function can be applied by synthesizing a resin having the function, or by moth-eye patterning.

The functional coating layer 170 is additionally added to the cover window 100 according the present disclosure to reinforce the strength and elasticity of thin glass substrate 110, it can protects the cover window 100 from external impact as well as the pressure of a touch pen.

Furthermore, the functional coating layer 170 prevents the crack occurring at the folding area, and the cover window 100 is reinforced with elasticity for the part where the surface is in contact with the display panel, to improve impact resistance, and scattering of the glass is prevented.

FIG. 10A shows data for the pen drop property of a flexible cover window according to an embodiment of the present disclosure, and FIG. 10B shows data for pen drop property of a conventional 0.07 T thickness flexible cover window. For the pen drop test, a pen with a ball size of 0.5 mm and a weight of 6.2 g was used, and the height at which the cover window was damaged was measured by free-falling the pen from various heights on the front surface of the glass substrate.

In an embodiment according to the present disclosure, as shown in FIGS. 5A, 5B and 5C, a pattern layer for impact dispersion (0.03 mm in height) is formed on the rear surface of a glass substrate (thickness 0.1 T), and an acrylic transparent resin material (0.03 mm in thickness) is filled, then an acrylic transparent resin layer (thickness 0.01 mm) was formed on the upper layer.

As shown in FIGS. 10A and 10B, the flexible cover window according to an embodiment of the present disclosure is damaged after the pen dropped at a height of 11 cm, and the conventional flexible cover window is damaged after the pen dropped at a height of 6 cm.

As described above, the flexible cover window according to the present disclosure has remarkably improved impact resistance due to improved pen drop property by dispersing the impact force, and it is possible to provide a flexible cover window having strength property and folding property.

What is claimed is:

1. A flexible cover window comprising at least one flat portion corresponding to flat areas of a flexible display, and a folding portion corresponding to a folding area of the flexible display and formed to be continued to the at least one flat portion:
   wherein the flexible cover window is made from a glass substrate having a pattern layer for impact dispersion thereon,
   wherein the pattern layer for impact dispersion is formed entirely on at least one flat portion and the folding portion, and the height of the pattern layer is less than half of the thickness of the glass substrate.

2. The flexible cover window according to claim 1, wherein the pattern layer for impact dispersion is formed on either one or both surfaces of the glass substrate.

3. The flexible cover window according to claim 1, wherein the pattern density on the folding portion and the pattern density on the flat portion are the same, or the pattern density on the folding portion is relatively higher than the pattern density on the flat portion.

4. The flexible cover window according to claim 1, wherein the height of the pattern in the pattern layer for impact dispersion formed on the folding portion and the flat portion are the same, or
   the height of the pattern in the pattern layer for impact dispersion formed on the folding portion is lower than the height of the pattern in the pattern layer for impact dispersion formed on the flat portion.

5. The flexible cover window according to claim 1, wherein the shape of the pattern layer for impact dispersion is at least one selected from the group consisting of semi-spheres, pyramids, cones, prisms, and cylinders, which is regularly or irregularly formed in the same size or different sizes.

6. The flexible cover window according to claim 5, wherein the pattern layer for impact dispersion is formed such that inner horizontal cross-sectional area of the glass substrate is wider than that outer horizontal cross-sectional area.

7. The flexible cover window according to claim 1, wherein the pattern layer for impact dispersion is a stripe pattern, or a stripe and space pattern repeatedly formed.

8. The flexible cover window according to claim 7, wherein, in the pattern layer for impact dispersion, the distance between the patterns formed on the flat portion are the same with the patterns formed on the folding portion, or
   the distance between the patterns formed on the folding portion is narrower than the patterns formed on the flat portion, and
   the direction of the stripe may be formed along a folding line.

9. The flexible cover window according to claim 1, wherein the pattern layer for impact dispersion is formed by any one of wet etching, laser patterning, blasting, and roller stamping, or
   any one of wet etching process after laser patterning, a wet etching process after blasting, and wet etching processes after roller stamping.

10. The flexible cover window according to claim 1, wherein the flexible cover window further comprises:
    a buffer resin layer formed on the front surface of the glass substrate on which the pattern layer for impact dispersion is formed, and
    a cover glass substrate formed on the buffer resin layer.

11. The flexible cover window according to claim 10, wherein concave spaces of the pattern layer for impact dispersion are filled with a transparent resin material.

12. The flexible cover window according to claim 11, wherein , a transparent resin layer is formed over the transparent resin material on the pattern layer for impact dispersion,
    the transparent resin material is filled first, and the transparent resin layer is formed using the same material and the same process, or
    the transparent resin material is filled first, and the transparent resin layer is formed later using different material.

13. The flexible cover window according to claim 12, wherein the transparent resin layer is
    formed on the front surface and rear surface of the glass substrate, or
    on the entire surfaces of front surface, the rear surface, and the side surface of the glass substrate.

14. The flexible cover window according to claim 13, wherein the transparent resin layer formed on the rear surface of the glass substrate and the transparent resin layer formed on the front surface of the glass substrate are formed with the same material, or the transparent resin layer formed on the rear surface of the glass substrate is formed with a relatively softer material than that of the transparent resin layer formed on the front surface.

15. The flexible cover window according to claim 11, wherein the transparent resin material and the transparent resin layer are preferably formed of Optically Clear Resin (OCR).

16. The flexible cover window according to claim 15, further comprises a functional coating layer, and the functional coating layer is formed of a single layer or multiple layers.

17. The flexible cover window according to claim 16, the functional coating layer is formed in a single layer or multiple layers.

18. The flexible cover window according to claim 17, wherein when the functional coating layer formed on the front surface of the flexible cover window is formed in multiple layers, and the higher a layer is, the harder a material of the layer is.

19. The flexible cover window according to claim 18, wherein AF(Anti-Finger) or AR(Anti-Reflective) function is applied to the functional coating layer formed on the top.

20. The flexible cover window according to claim 16, wherein the functional coating layer formed on the front surface of the flexible cover window is implemented as a strength reinforcing layer, and the functional coating layer formed on the rear surface of the flexible cover window is implemented as an elasticity reinforcing layer.

\* \* \* \* \*